(12) United States Patent
Urai et al.

(10) Patent No.: US 9,788,565 B1
(45) Date of Patent: Oct. 17, 2017

(54) CARBONATED BEVERAGE, SYRUP USED FOR PREPARING CARBONATED BEVERAGE, METHOD FOR MANUFACTURING CARBONATED BEVERAGE, AND METHOD FOR SUPPRESSING FOAMING IN CARBONATED BEVERAGE

(71) Applicant: SUNTORY BEVERAGE & FOOD LIMITED, Tokyo (JP)

(72) Inventors: Soichiro Urai, Kanagawa (JP); Akiko Izumi, Kanagawa (JP); Koji Nagao, Kanagawa (JP)

(73) Assignee: SUNTORY BEVERAGE & FOOD LIMITED, Tokyo (JP)

( * ) Notice: Subject to any disclaimer, the term of this patent is extended or adjusted under 35 U.S.C. 154(b) by 0 days.

(21) Appl. No.: 15/647,707

(22) Filed: Jul. 12, 2017

Related U.S. Application Data

(63) Continuation of application No. 15/515,319, filed as application No. PCT/JP2015/077831 on Sep. 30, 2015.

(30) Foreign Application Priority Data

Sep. 30, 2014 (JP) ................................. 2014-202600

(51) Int. Cl.
*A23L 2/60* (2006.01)
*A23L 2/00* (2006.01)

(52) U.S. Cl.
CPC .. *A23L 2/60* (2013.01); *A23L 2/00* (2013.01)

(58) Field of Classification Search
CPC ..................................... A23L 2/60; A23L 2/00

USPC ................................. 426/329, 548, 590, 477
See application file for complete search history.

(56) References Cited

U.S. PATENT DOCUMENTS

| | | | |
|---|---|---|---|
| 4,612,942 | A | 9/1986 | Dobberstein et al. |
| 8,029,846 | B2 | 10/2011 | Talebi et al. |
| 8,277,861 | B2 | 10/2012 | Chang et al. |
| 8,277,862 | B2 | 10/2012 | Lee et al. |
| 8,377,491 | B2 | 2/2013 | Prakash et al. |
| 8,512,789 | B2 | 8/2013 | Prakash et al. |
| 8,535,746 | B2 | 9/2013 | Chang et al. |
| 8,535,747 | B2 | 9/2013 | Lee et al. |

(Continued)

FOREIGN PATENT DOCUMENTS

| | | |
|---|---|---|
| EP | 2 510 800 | 10/2012 |
| JP | 2004-520073 | 7/2004 |

(Continued)

OTHER PUBLICATIONS

International Search Report and Written Opinion issued in PCT/JP2015/077831, dated Dec. 15, 2015, along with an English language translation.

(Continued)

*Primary Examiner* — Helen F Heggestad
(74) *Attorney, Agent, or Firm* — Greenblum & Bernstein, P.L.C.

(57) ABSTRACT

An embodiment of the present invention provides a carbonated beverage comprising a *stevia* extract in which foaming is suppressed and a method for producing the same. A carbonated beverage comprising RebA and RebD and/or RebM, wherein a content of RebA is 500 ppm or less; a content of RebD and/or RebM is 486 ppm or less; ((RebD and/or RebM)/RebA) is 0.45 or more in a mass ratio; and a total content of RebA and RebD and/or RebM is 0.5 to 13.5 in Brix in terms of sucrose.

14 Claims, 4 Drawing Sheets

(56) References Cited

U.S. PATENT DOCUMENTS

| | | |
|---|---|---|
| 8,703,225 B2 | 4/2014 | Morita et al. |
| 8,937,168 B2 | 1/2015 | Evans et al. |
| 8,945,652 B2 | 2/2015 | Prakash et al. |
| 8,962,058 B2 | 2/2015 | Prakash et al. |
| 9,125,429 B2 | 9/2015 | Prakash et al. |
| 9,131,718 B2 | 9/2015 | Shi et al. |
| 9,149,051 B2 | 10/2015 | Prakash et al. |
| 9,169,285 B2 | 10/2015 | Prakash et al. |
| 9,173,425 B2 | 11/2015 | Prakash et al. |
| 2007/0082106 A1 | 4/2007 | Lee et al. |
| 2007/0116823 A1 | 5/2007 | Prakash et al. |
| 2009/0162484 A1 | 6/2009 | Bell et al. |
| 2009/0214753 A1 | 8/2009 | Morita et al. |
| 2010/0112159 A1 | 5/2010 | Abelyan et al. |
| 2011/0160311 A1 | 6/2011 | Prakash et al. |
| 2013/0071521 A1 | 3/2013 | Lee et al. |
| 2013/0337138 A1 | 12/2013 | Purkayastha et al. |
| 2014/0017378 A1 | 1/2014 | Purkayastha et al. |
| 2014/0099403 A1 | 4/2014 | Prakash et al. |
| 2014/0342043 A1 | 11/2014 | Bell et al. |
| 2014/0342044 A1 | 11/2014 | Bell et al. |
| 2014/0357588 A1 | 12/2014 | Markosyan et al. |
| 2015/0216218 A1 | 8/2015 | Prakash et al. |
| 2016/0128371 A1 | 5/2016 | Purkayastha et al. |
| 2016/0192685 A1 | 7/2016 | Markosyan et al. |
| 2016/0331011 A1 | 11/2016 | Carlson et al. |
| 2017/0135389 A1 | 5/2017 | Carlson et al. |

FOREIGN PATENT DOCUMENTS

| | | |
|---|---|---|
| JP | 2008-228633 | 10/2008 |
| JP | 2009-517043 | 4/2009 |
| JP | 2012-179015 | 9/2012 |
| JP | 2012-213341 | 11/2012 |
| JP | 2014-087359 | 5/2014 |
| WO | 02/087359 | 11/2002 |
| WO | 2010/146463 | 12/2010 |
| WO | 2013/096420 | 6/2013 |
| WO | 2013/176738 | 11/2013 |
| WO | 2014/186084 | 11/2014 |
| WO | 2014/186250 | 11/2014 |
| WO | 2014/193934 | 12/2014 |

OTHER PUBLICATIONS

Hidetoshi Hamada, "Coca-cola Sha no Marketing ni Tsuite~Seihin Goto no Aji no Chigai no Shiten kara~" H23 Kochi Univ. of Technology Management Gakubu Sotsugyo Ronbun Yoshi, Mar. 2012, [retrieval date Dec. 4, 2015]; Internet<URL:http://www.kochi-tech.ac.jp/library/ron/2011/2011man/a1120394.pdf>, along with a partial English language translation.

Kokuzeicho Shotei Bunsekiho (Showa 36 Nen Kokuzeicho Kunrei Dai 1 Go) (Heisei 19 Nen Kaisei), [on line], 2007, table 3, [retrieval date Jul. 2, 2015], Internet<URL: https://www.nta.go.jp/shiraberu/zeiho-kaishaku/tsutatsu/kobetsu/sonota/070622/pdf/fl03.pdf>, along with a partial English language translation.

Japanese Office Action issued JP Patent App. No. 2016-552142, dated Dec. 22, 2016, along with an English language translation.

U.S. Appl. No. 15/541,164, filed Jun. 30, 2017.

Prakash et al., "Development of Next Generation Stevia Sweetener: Rebaudioside M" *Foods* 3:162-175, 2014.

International Search Report and Written Opinion issued in PCT/JP2016/080413, dated Dec. 27, 2017.

U.S. Appl. No. 15/515,319, filed Mar. 29, 2017.

(A)

(B)

(A)

RebA 53ppm

*P<0.05 vs RebA 100

(B)

RebA 53ppm

CARBONATED BEVERAGE, SYRUP USED FOR PREPARING CARBONATED BEVERAGE, METHOD FOR MANUFACTURING CARBONATED BEVERAGE, AND METHOD FOR SUPPRESSING FOAMING IN CARBONATED BEVERAGE

CROSS-REFERENCE TO RELATED APPLICATION

This application is a continuation application of the pending U.S. application Ser. No. 15/515,319 filed on Mar. 29, 2017, which is U.S. National Stage of International Application No. PCT/JP2015/077831 filed Sep. 30, 2015, which claims the benefit of priority of the Japanese Patent Application No. 2014-202600 filed on Sep. 30, 2014, the contents of which are expressly incorporated by reference herein in their entireties.

DETAILED DESCRIPTION OF THE INVENTION

Technical Field

This embodiment relates to a carbonated beverage, a syrup used for the preparation of a carbonated beverage, a method for producing a carbonated beverage, and a method for suppressing the foaming of a carbonated beverage.

BACKGROUND ART

Carbonated beverages are preferably drunk by a wide range of consumers. Currently commercially available carbonated beverages are various and have properties such as visually pleasing a drinker by foaming when opening a container or when pouring the carbonated beverage into a container such as a glass, and giving to a drinker a refreshing feeling in the throat. Such properties of the carbonated beverages are mainly due to carbon dioxide gas contained in the carbonated beverages, but the foaming may be a problem.

In order to suppress foaming during the production of a carbonated beverage and during opening a container thereof, Patent Literature 1 discloses using a particular antifoaming agent such as a silicone oil, a glycerin fatty acid ester, or a sorbitan fatty acid ester. Patent Literature 2 discloses, regarding a cup type beverage vending machine, blending sucralose or acesulfame potassium in a syrup in order to suppress excessive foaming caused by the mixing of the syrup and carbonated water. On the other hand, in Patent Literatures 3 and 4, blending a non-polymerized catechin and a *stevia* extract in a carbonated beverage at a particular ratio is disclosed, but this is directed to the improvement of carbon dioxide gas retention properties and is not directed to the suppression of foaming.

CITATION LIST

Patent Literature

Patent Literature 1: Japanese Patent Laid-Open No. 2014-087359
Patent Literature 2: Japanese Patent Laid-Open No. 2008-228633
Patent Literature 3: Japanese Patent Laid-Open No. 2012-179015
Patent Literature 4: Japanese Patent Laid-Open No. 2012-213341

SUMMARY OF INVENTION

Technical Problem

In response to an increase in nature orientation in recent years, the inventors of this application have conducted a study on the use of natural sweeteners in beverages. In the course of the study, when a container is opened, a carbonated beverage comprising this natural sweetener foams and bubbles over the container in some cases. Alternatively, also when the carbonated beverage is poured into another container such as a glass after opening, foaming occurs and the carbonated beverage bubbles over in some cases. As natural sweeteners, Stevioside, Rebaudioside (hereinafter referred to as "Reb"), and the like as the sweet components of *stevia* extracts are known, and the details will be described later.

The present invention has been made in view of the above-described problem, and it is an object of the present invention to provide a carbonated beverage in which foaming is suppressed, a syrup used for the preparation of a carbonated beverage, a method for producing a carbonated beverage, and a method for suppressing the foaming of a carbonated beverage.

Solution to Problem

According to this embodiment, in a carbonated beverage, a content of RebA is 500 ppm or less, a content of RebD and/or RebM is 486 ppm or less, ((RebD and/or RebM)/RebA) is 0.45 or more in a mass ratio, and a total content of RebA and RebD and/or RebM is 0.5 to 13.5 in Brix in terms of sucrose.

DESCRIPTION OF EMBODIMENTS

Figure 1:
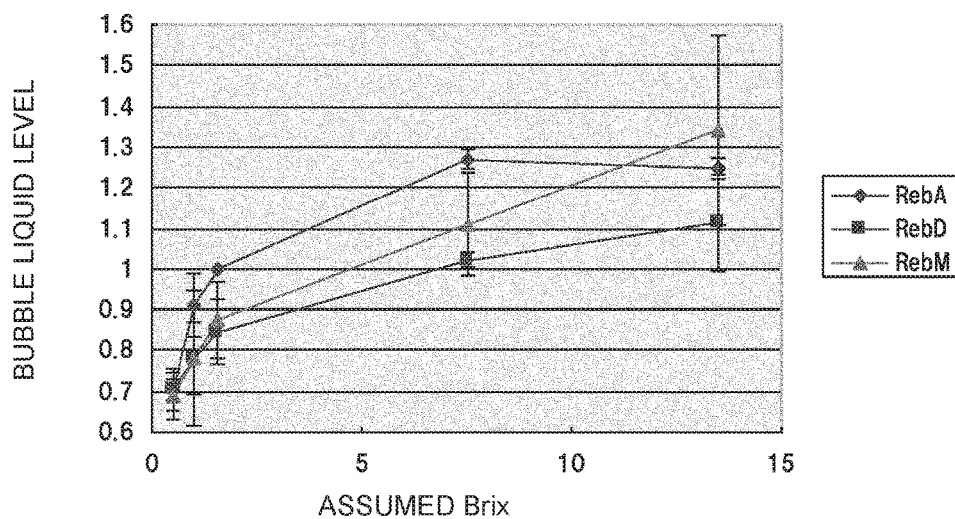
FIG. 1 shows the influence of the content of RebA, RebD, and RebM on foaming.

A carbonated beverage according to an embodiment of the present invention will be described below with reference to the drawings.

In the carbonated beverage in the embodiment of the present invention, the content of RebA is 500 ppm or less, the content of RebD and/or RebM is 486 ppm or less, ((RebD and/or RebM)/RebA) is 0.45 or more in a mass ratio, and the total content of RebA and RebD and/or RebM is 0.5 to 13.5 in Brix in terms of sucrose.

Reb is known as a sweet component contained in a *stevia* extract. The *stevia* extract is obtained by extraction from *stevia* dry leaves and purification. A *stevia* is a composite perennial plant native to Paraguay in South America, and its scientific name is *Stevia Rebaudiana* Bertoni. The *stevia* comprises a component having about 300 times or more the sweetness of sugar and therefore is grown in order to extract this sweet component and use it as a natural sweetener. As Reb, RebA, RebB, RebC, RebD, and RebE are known. Further, recently, it has been reported presence of various glycosides such as RebM, which is described in Japanese Patent Domestic Announcement No. 2012-504552. Among various Reb, RebA is evaluated as a sweetener having a high degree of sweetness and good sweetness and widely used. In the embodiment of the present invention, as the *stevia* extract, RebA, RebD, and RebM are paid attention to. RebA, RebD, and RebM are available on the market and can also be synthesized by way of organic chemistry. Alternatively, using a *stevia* extract as a starting raw material, RebA, RebD, and RebM can also be separated and purified. For example, RebA, RebD, and RebM can be purified according to methods described in Japanese Patent Domestic Announcement No. 2009-517043, U.S. Pat. No. 8,414,949, and Foods 2014, 3(1), 162-175; doi: 10.3390/foods3010162, respectively. RebA, RebD, and RebM may be analyzed by any method and can be analyzed, for example, by a high performance liquid chromatograph (HPLC) set under conditions described in Japanese Patent Domestic Announcement No. 2012-504552. RebA, RebD, and RebM are analyzed herein by the method unless otherwise described.

A carbonated beverage refers to a beverage comprising carbon dioxide gas. Examples of the carbonated beverage include refreshing beverages, nonalcoholic beverages, and alcoholic beverages. Specific examples include, but are not limited to, sparkling beverages, cola, diet cola, ginger ale, soda pop, and carbonated water provided with a fruit juice flavor. The inventors of this application have found for the first time that regarding a carbonated beverage comprising a *stevia* extract, RebA is involved in foaming that can be a problem during opening, in a case where the carbonated beverage is poured into a container, and the like. In the embodiment of the present invention, foaming is suppressed by decreasing the content of RebA as a *stevia* extract in a carbonated beverage. The content of RebA can be, for example, 500 ppm or less, preferably 450 ppm or less, more preferably 383 ppm or less, and further preferably 250 ppm or less in the carbonated beverage but is not limited to these. Alternatively, RebA may be contained in the carbonated beverage to the extent that even slight sweetness is felt, and, for example, 0.5 ppm or more, preferably 1 ppm or more, and more preferably 16.7 ppm or more of RebA may be contained in the carbonated beverage.

When the content of RebA as a *stevia* extract in a carbonated beverage is simply decreased as described above, sweetness derived from the *stevia* extract cannot be sufficiently given to the carbonated beverage. The inventors of this application have found for the first time that RebD and RebM are less likely to foam than RebA. In other words, in the embodiment of the present invention, by replacing RebA as a *stevia* extract with RebD and/or RebM in a carbonated beverage, sweetness derived from a *stevia* extract can be sufficiently given while the problem of the foaming of the carbonated beverage is addressed. In the carbonated beverage in the embodiment of the present invention, the content of RebD and/or RebM can be an amount required as an alternative to RebA. The carbonated beverage can contain RebD and RebM singly or in combination. When the carbonated beverage comprises RebD alone, the content of RebD is not limited and can be, for example, 486 ppm or less. When the carbonated beverage comprises RebM alone, the content of RebM is not limited and can be, for example, 450 ppm or less, preferably 404 ppm or less, and more preferably 271 ppm or less. When the carbonated beverage comprises RebD and RebM, the total amount of RebD and RebM can be, for example, 486 ppm or less.

The total amount of RebA, RebD, and RebM as a *stevia* extract in the carbonated beverage can be set in a required range, can be set in a range that does not cause a problem in terms of flavor, or can also be set in a range required for a low calorie carbonated beverage. For example, although not limited, the total amount of RebA, RebD, and RebM in the carbonated beverage can be equivalent to Brix 0.5 to 13.5, preferably 0.5 to 12, more preferably 0.5 to 11.5, and further preferably 0.5 to 7.5 in terms of sucrose. When the total amount is less than Brix 0.5 in terms of sucrose, sweetness derived from the *stevia* extract cannot be sufficiently provided, and the bubble suppression effect by the replacement of RebA with RebD and/or RebM may not be sufficiently exerted. On the other hand, in a case where the total amount is more than Brix 13.5 in terms of sucrose, regarding the carbonated beverage, the bubble suppression effect by the replacement of RebA with RebD and/or RebM is not obtained, and moreover the flavor may become worse due to too strong sweetness.

Here, Brix in terms of sucrose can be calculated from the degree of sweetness of Reb based on sucrose and the content of Reb. RebA has 300 times the sweetness of sucrose, RebD has 285 times the sweetness of sucrose, and RebM has 285 times the sweetness of sucrose. Therefore, the amount of Reb equivalent to Brix 1 in terms of sucrose can be calculated as 33.3 ppm for RebA and 35.1 ppm for RebD (also RebM).

The relationship between the content of RebA, RebD, and RebM and the foaming suppression effect can be confirmed as follows. In order to adjust the degrees of sweetness of test solutions to be equivalent to Brix 0.5, 1.0, 1.59, 7.5, and 13.5 in terms of sucrose, the content of Reb was adjusted as follows. 16.7 ppm, 33.3 ppm, 53 ppm, 250 ppm, and 450 ppm of RebA was dissolved in 15.8 mL of pure water. 17.6 ppm, 35.1 ppm, 55.7 ppm, 271.2 ppm, and 486 ppm of each of RebD and RebM was dissolved in 15.8 mL of pure water. Each solution was cooled to 4° C., and the amount of liquid was adjusted to 100 mL with carbonated water. The container was sealed and left in a refrigerator at 4° C. for 1 hour. The container was opened, and an inverted 500 mL graduated cylinder was placed over the spout of the container in which the test solution was contained, and fixed. The graduated cylinder and the container were reversed to pour the test solution into the graduated cylinder. The scale mark at the bubble rising surface was read and taken as the volume corresponding to bubble liquid level. The volume corresponding to bubble liquid level is shown in FIG. 1 as a relative value in which the volume corresponding to bubble liquid level regarding the test solution comprising RebA at Brix 1.59 (53 ppm) in terms of sucrose is 1. In the case of blending at Brix 0.5 in terms of sucrose, no substantial difference was seen in the volume corresponding to bubble liquid level among RebA, RebD, and RebM. In the case of blending at Brix 1.0 or more in terms of sucrose, for RebD and RebM, the volume corresponding to bubble liquid level was decreased compared with that for RebA. For RebD, also at Brix 13.5 in terms of sucrose, the bubble liquid level was decreased compared with that for RebA. For RebM, when the amount blended was Brix 11.5 or less in terms of sucrose, the bubble liquid level was decreased compared with that for RebA.

From this, it was shown that the foaming suppression effect of RebD was effective in the alternative to RebA at Brix 0.5 to 13.5 or 1.0 to 13.5 in terms of sucrose. It was shown that the foaming suppression effect of RebM was effective in the alternative to RebA at Brix 0.5 to 11.5 or 1.0 to 11.5 in terms of sucrose. It is also suggested that the total content of RebA and RebD and/or RebM being 0.5 to 13.5 in Brix in terms of sucrose is effective in the suppression of foaming.

The carbonated beverage in the embodiment of the present invention can further comprise components generally used in carbonated beverages, such as caffeine, cinnamaldehyde, caramel coloring, and sweeteners (sugar, isomerized liquid sugars, and high intensity sweeteners such as aspartame, sucralose, and acesulfame K), perfumes, acidulants (citric acid, tartaric acid, malic acid, phosphoric acid, and lactic acid), colorants, fruit juices, and fruit juice purees, milk and milk products, and nutrient supplements (vitamins, calcium, minerals, and amino acids). The carbonated beverage may comprise a single or a combination of a plurality of these components. For example, the carbonated beverage can comprise caffeine, cinnamaldehyde, caramel coloring, or a combination of two or more of these together with the *stevia* extract. As one mode, the carbonated beverage in the embodiment of the present invention can comprise caffeine. Here, the caffeine may be in the form of an extract of a plant comprising caffeine (tea leaves, kola nuts, coffee beans, guarana, or the like) or its concentrate in addition to a purified product that can be used as a food additive (a purified product having a caffeine content of 98.5% or more) and a roughly purified product that can be used as a food (caffeine content of 50 to 98.5%). In the embodiment of the present invention, the content of caffeine in the carbonated beverage can be 1 to 200 ppm. The quantification of caffeine may be performed using any method and can be performed, for example, by filtering the carbonated beverage by a membrane filter (cellulose acetate membrane 0.45 μm manufactured by ADVANTEC) and subjecting the sample to HPLC set under the following conditions. The caffeine content is quantified herein by the method unless otherwise mentioned.

(Conditions of HPLC for Caffeine Quantification)
Column TSK-gel ODS-80TsQA (4.6 mmφ×150 mm, Tosoh Corporation)
Mobile phase A water:trifluoroacetic acid=1000:0.5
Mobile phase B acetonitrile:trifluoroacetic acid=1000:0.5
Flow rate 1.0 ml/min
Column temperature 40° C.
Gradient conditions
A:B=95:5 is maintained from the start of analysis to 5 minutes after
A:B=5:95 from 5 minutes to 20 minutes
A:B=5:95 is maintained from 20 minutes to 25 minutes
A:B=95:5 from 25 minutes to 26 minutes
A:B=95:5 is maintained from 26 minutes to 30 minutes
Injection volume 5.0 μL
Detection wavelength 280 nm
Standard substance anhydrous caffeine (NACALAI TESQUE, INC.).

As another mode, the carbonated beverage in the embodiment of the present invention can comprise cinnamaldehyde. Here, cinnamaldehyde ($C_6H_5CH=CH-CHO$, molecular weight 132.16) is one of aromatic aldehydes known as a cinnamon aroma component and is available as a perfume preparation. In the embodiment of the present invention, the carbonated beverage can comprise cinnamaldehyde in an amount of a particular range. For example, the content of cinnamaldehyde in the carbonated beverage in the embodiment of the present invention can be 0.5 to 50 ppm, preferably 0.5 to 32 ppm, and 1.0 to 20 ppm. For the quantification of cinnamaldehyde, for example, cinnamaldehyde can be quantified by a method using gas chromatography, a mass spectrometer, or the like. The content of cinnamaldehyde is quantified herein by the method unless otherwise described.

As still another mode, the carbonated beverage in the embodiment of the present invention can comprise caramel coloring. Here, as the caramel coloring, known edible caramel coloring can be used. For example, a substance obtained by heat-treating an edible carbohydrate typified by sugar or glucose, one obtained by adding an acid or an alkali to an edible carbohydrate and heat-treating the mixture, and the like can be used as the caramel coloring. In addition, a sugar contained in a fruit juice or a vegetable juice can also be caramelized and used, and in this case, the sugar can be caramelized by heat treatment, treatment with an acid or an alkali, or the like. In the embodiment of the present invention, the carbonated beverage can comprise caramel coloring at a content of a particular range.

Figure 2:
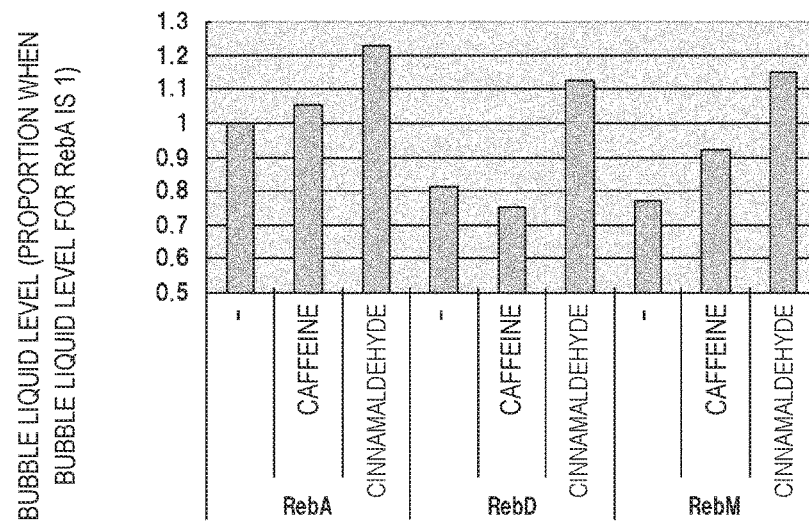
FIG. 2 shows the influence of RebA, RebD, and RebM on foaming.

The foaming suppression effect of RebD and RebM in combination with caffeine or cinnamaldehyde can be confirmed as follows. For RebA, RebD, and RebM, commercial products were generally used. To adjust sweetness of test solutions to Brix 1.59 in terms of sucrose, 53 ppm of RebA, 55.7 ppm of RebD, and 55.7 ppm of RebM were each dissolved alone in 15.8 mL of pure water. In addition, each of 53 ppm of RebA, 55.7 ppm of RebD, and 55.7 ppm of RebM, in combination with 10 ppm of caffeine or 50 μl/100 ml of cinnamaldehyde, was dissolved in 15.8 mL of pure water. Each solution was cooled to 4° C. and volume of the solution was adjusted to 100 mL with carbonated water. The container was sealed and left in a refrigerator at 4° C. for 1 hour. The container was opened, and an inverted 500 mL graduated cylinder was placed over the spout of the container in which the test solution was contained, and fixed. The graduated cylinder and the container were reversed to pour the test solution into the graduated cylinder. The scale mark at the bubble rising surface was read and taken as the volume corresponding to bubble liquid level. The volume corresponding to bubble liquid level is shown in FIG. 2 as a relative value in which the volume corresponding to bubble liquid level regarding the test solution comprising RebA alone is 1.

For the test solution comprising RebM alone, the volume corresponding to bubble liquid level was about 0.8 compared with that for the test solution comprising RebA alone. Also for RebD, a similar result was obtained. In combination with caffeine, for the test solution comprising RebD or RebM, the volume corresponding to bubble liquid level was greatly decreased compared with that for the test solution comprising RebA. Also when RebA, RebD, and RebM were combined with cinnamaldehyde, a similar result was obtained. From the above results, it was shown that RebD and RebM exerted the foaming suppression effect even in combination with other materials such as caffeine and cinnamaldehyde, which are widely blended in carbonated beverages.

Figure 3:
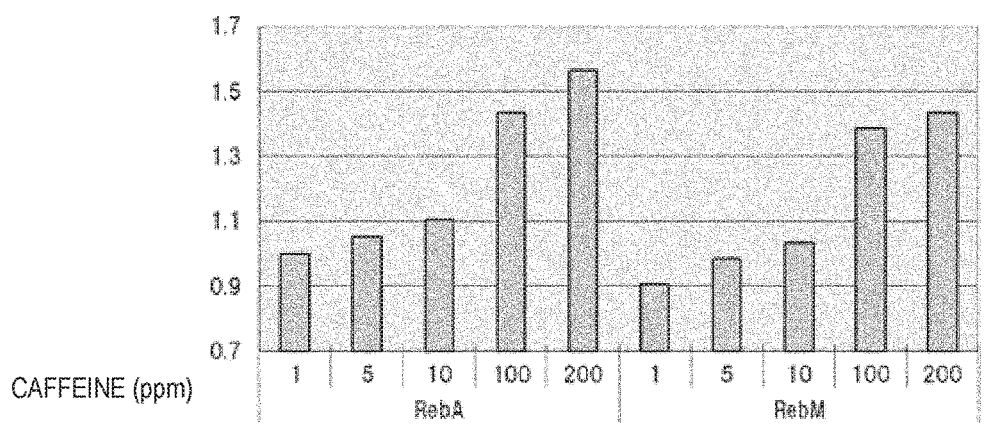
FIG. 3 shows in (A) and (B) the influence of the combination of Reb and caffeine on foaming.
Figure 3:
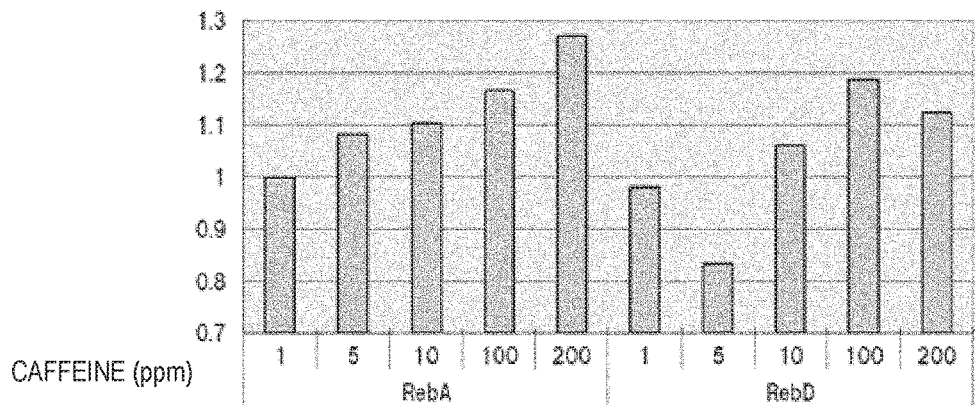

Further, the foaming suppression effect of RebD and RebM in combination with caffeine can be confirmed as follows. In order to adjust sweetness of test solutions to Brix 1.59 in terms of sucrose, the content was set at 53 ppm of RebA, 55.7 ppm of RebD, and 55.7 ppm of RebM. RebA, RebD, and RebM were each dissolved in 15.8 mL of pure water together with caffeine. Here, the caffeine content was changed to 1 ppm, 5 ppm, 10 ppm, 100 ppm, and 200 ppm. Each solution was cooled to 4° C. and volume of the solution was adjusted to 100 mL with carbonated water. The container was sealed and left in a refrigerator at 4° C. for 1 hour. The container was opened, and an inverted 500 mL graduated cylinder was placed over the spout of the container in which the test solution was contained, and fixed. The graduated cylinder and the container were reversed to pour the test solution into the graduated cylinder. The scale mark at the bubble rising surface was read and taken as the volume corresponding to bubble liquid level. The volume corresponding to bubble liquid level is shown in FIG. 3(A) as a relative value in which the volume corresponding to bubble liquid level of the test solution comprising 53 ppm of RebA and 1 ppm of caffeine is 1. In combination with any amount of caffeine, for the test solution comprising RebM, the volume corresponding to bubble liquid level was decreased compared with that for the test solution comprising RebA. Also for RebD, a similar result was obtained (FIG. 3(B)).

From these results, it was shown that RebM and RebD effectively suppressed the foaming of the carbonated beverage compared with RebA even when combined with caffeine. It was also suggested that this foaming suppression effect was exerted regardless of the content of caffeine. Caffeine is a component generally blended in carbonated beverages. Thus, it is suggested that the effect achieved by RebM and/or RebD can be widely applied to carbonated beverages.

The carbonated beverage may comprise RebD and/or RebM and RebA at a particular ratio. For example, ((RebD and/or RebM)/RebA) can be 0.45 or more, preferably 1.1 or more, more preferably 2.5 or more, and further preferably 6.0 or more in a mass ratio. When the ratio is less than 0.45, the influence of RebA becomes strong, and the foaming of the carbonated beverage cannot be suppressed.

Figure 4:
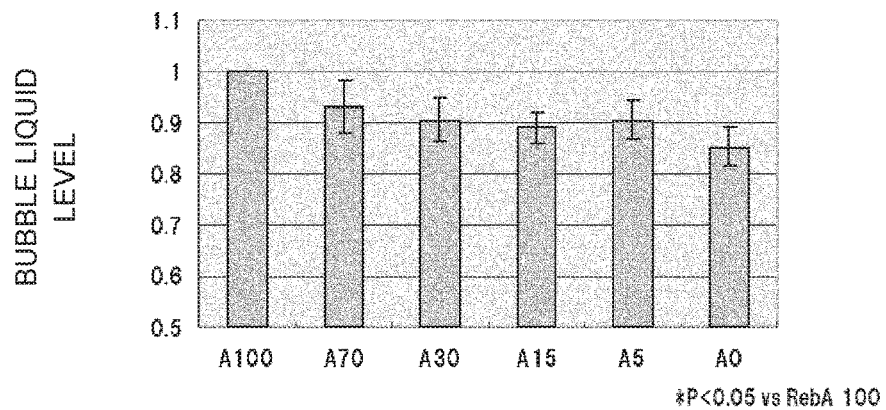
FIG. 4 shows in (A) and (B) the influence of the ratio between RebM or RebD and RebA on foaming.
Figure 4:
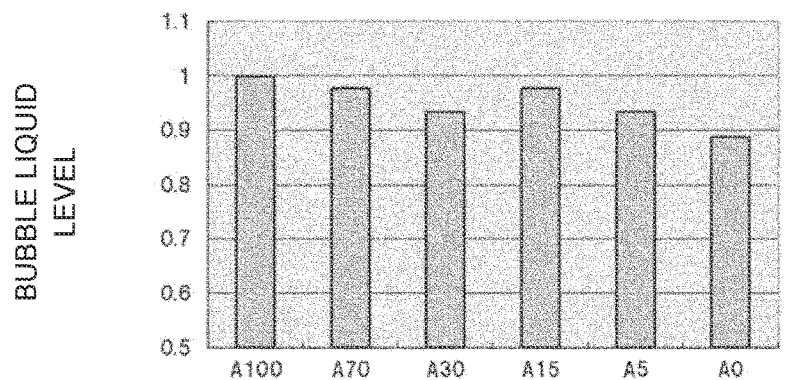

The influence of the content ratio of RebM and/or RebD to RebA on foaming can be confirmed as follows. The degrees of sweetness of test solutions were adjusted to be equivalent to Brix 1.59 in terms of sucrose. RebA and RebM were combined at ratios of 100:0, 70:30, 30:70, 15:85, 5:95, and 0:100 in Brix in terms of sucrose and dissolved in 15.8 mL of pure water. Each solution was cooled to 4° C. and volume of the solution was adjusted to 100 mL with carbonated water. The container was sealed and left in a refrigerator at 4° C. for 1 hour. Also for combinations of RebA and RebD, a similar operation was performed. The container was opened, and an inverted 500 mL graduated cylinder was placed over the spout of the container in which the test solution was contained, and fixed. The graduated cylinder and the container were reversed to pour the test solution into the graduated cylinder. The scale mark at the bubble rising surface was read and taken as the volume corresponding to bubble liquid level. The volume corresponding to bubble liquid level is shown in FIG. 4 as a relative value in which the volume corresponding to bubble liquid level regarding the test solution comprising RebA alone is 1. In FIG. 4(A), A100 represents RebA:RebM=100:0, A70 represents RebA:RebM=70:30, A30 represents RebA:RebM=30:70, A15 represents RebA:RebM=15:85, A5 represents RebA:RebM=5:95, and A0 represents RebA:RebM=0:100 (The ratios are all in Brix in terms of sucrose). For FIG. 4(B), RebM is replaced by RebD in the description of the above FIG. 4(A).

It was shown that as the proportion of RebM increased, the volume corresponding to bubble liquid level decreased (FIG. 4(A)). This tendency was clear when the proportion of RebM in Brix in terms of sucrose was 30% or more, and was clearer particularly when the proportion of RebM in Brix in terms of sucrose was 70% or more. Also for RebD, a similar tendency was shown (FIG. 4(B)). From these results, it was shown that by replacing RebA with RebM and/or RebD, foaming was suppressed without substantially changing the sweetness of the carbonated beverage. It was shown that when ((RebD and/or RebM)/RebA) was about 0.45 or more in a mass ratio, foaming was suppressed.

Figure 5:
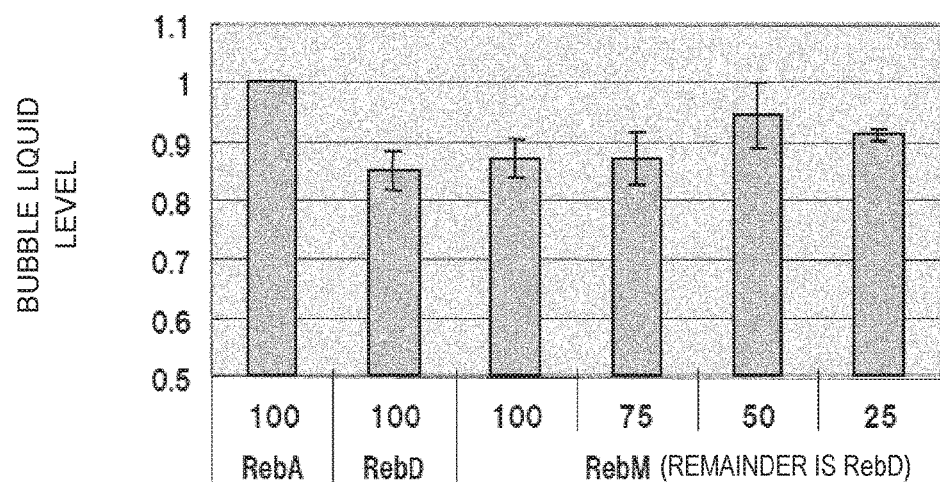
FIG. 5 shows the influence of the combination of RebD and RebM on foaming.

In the embodiment of the present invention, when RebD and RebM are contained in combination in the carbonated beverage, RebD and RebM may be combined at any ratio. The influence of the combination of RebD and RebM on foaming can be confirmed as follows. In order to adjust sweetness of test solutions to Brix 1.59 in terms of sucrose, the content of Reb was adjusted. RebD and RebM were combined at ratios of 0:100, 25:75, 50:50, 75:25, and 100:0 in Brix in terms of sucrose and dissolved in 15.8 mL of pure water. Each solution was cooled to 4° C. and volume of the solution was adjusted to 100 mL with carbonated water. The container was sealed and left in a refrigerator at 4° C. for 1 hour. A test solution comprising RebA alone was also prepared in the similar manner. The container was opened, and an inverted 500 mL graduated cylinder was placed over the spout of the container in which the test solution was contained, and fixed. The graduated cylinder and the container were reversed to pour the test solution into the graduated cylinder. The scale mark at the bubble rising surface was read and taken as the volume corresponding to bubble liquid level. The volume corresponding to bubble liquid level is shown in FIG. 5 as a relative value in which the volume corresponding to bubble liquid level regarding the test solution comprising RebA alone is 1. In the figure, "100" on the horizontal axis represents the test solution comprising RebA, RebD, or RebM alone. "75", "50", and "25" on the horizontal axis represent the test solutions comprising RebM and RebD at ratios of 75:25, 50:50, and 25:75 in Brix in terms of sucrose respectively.

For the test solution comprising RebD or RebM alone, the volume corresponding to bubble liquid level was significantly decreased compared with the case where RebA was contained alone. It was also confirmed that for the test solutions comprising the combinations of RebD and RebM, the volume corresponding to bubble liquid level was decreased compared with that for the test solution comprising RebA alone. From these results, it was shown that even when RebA was replaced with RebD and RebM in combination, foaming could be suppressed without substantially changing the degree of sweetness of the carbonated beverage.

The carbonated beverage in the embodiment of the present invention may further comprise sweeteners generally used in beverages, such as sucrose, glucose, fructose, isomerized liquid sugars, and high intensity sweeteners such as aspartame, sucralose, and acesulfame K. The carbonated beverage may comprise a single or plurality of these sweeteners. As one mode, the carbonated beverage in the embodiment of the present invention can further comprise sucrose. Here, the content of sucrose in the carbonated beverage is not limited and can be 6 to 12 g/100 g. The quantification of saccharides such as sucrose can also be performed, for example, by a usual method such as high performance liquid chromatography (HPLC). HPLC can be performed, for example, under the following conditions.

Equipment used: HP1100 system manufactured by HP
Column used: LiChrospher 100 NH2 (5 μm) (4 mm×250 mm)
Mobile phase: acetonitrile:water=75:25
Flow rate: 1.0 mL/min Column temperature: 40° C.
Injection volume: 10 μL
Detector: Sugar content differential refractometer (Shodex RI-71)

Saccharides such as sucrose are quantified herein by the method unless otherwise described.

The carbonated beverage in the embodiment of the present invention comprises carbon dioxide gas. The content of carbon dioxide gas in the carbonated beverage can be defined by gas pressure. For the carbon dioxide gas in the carbonated beverage, the gas pressure can be, for example, 1.7 kgf/cm$^2$ or more, 1.89 kgf/cm$^2$ or more, or 2.15 kgf/cm$^2$ or more. The upper limit of the gas pressure may be, for example, 5.0 kgf/cm$^2$ or less or 4.0 kgf/cm$^2$ or less, as required. The gas pressure regarding the carbonated beverage refers to the gas pressure of carbon dioxide gas in the carbonated beverage in a container unless otherwise described. Therefore, the carbonated beverage can be filled into a container. For the container, a container of any form and material can be used, and, for example, the container may be a container such as a bottle, a can, a barrel, or a PET bottle. The measurement of gas pressure can be performed, for example, by fixing a beverage set at 20° C. in a gas internal pressure meter, opening the gas internal pressure meter cock once to remove gas, closing the cock again, swinging the gas internal pressure meter, and reading the value when the pointer reaches a certain position. The gas pressure of the carbonated beverage is measured herein using the method unless otherwise described.

Figure 6:
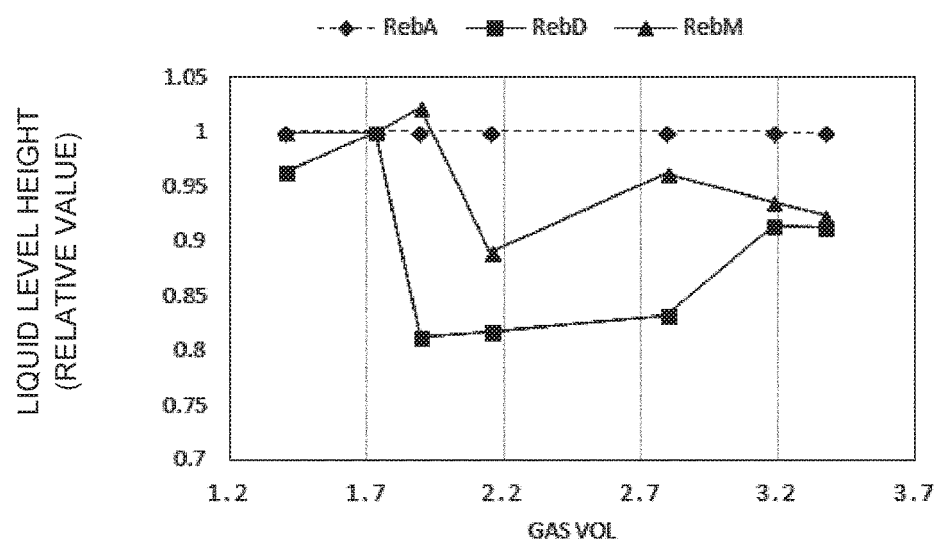
FIG. 6 shows the influence of the gas pressure of a carbonated beverage on foaming.

The influence of the carbon dioxide gas content of the carbonated beverage on foaming can be confirmed as follows. To prepare each test solution, RebA, RebD, and RebM equivalent to Brix 10 in terms of sucrose were each added to pure water and dissolved, and then carbonated water was added to adjust a gas pressure to a defined value. An inverted 500 mL graduated cylinder was placed over the spout of the container in which the test solution was contained, and fixed. The graduated cylinder and the container were reversed to pour the test solution into the graduated cylinder. The scale mark at the bubble rising surface was read and taken as the volume corresponding to bubble liquid level. The volume corresponding to bubble liquid level is shown in FIG. 6 as a relative value in which the volume corresponding to bubble liquid level regarding the test solution comprising RebA equivalent to Brix 10 in terms of sucrose is 1. In the figure, "GAS VOL" represents gas pressure. Compared with the test solution comprising RebA, for the test solution comprising RebM, foaming tended to be suppressed at a gas pressure of 1.9 kgf/cm$^2$ or more, and further, foaming tended to be more strongly suppressed at a gas pressure of 2.15 kgf/cm$^2$ or more. For the test solution comprising RebD, foaming tended to be suppressed at a gas pressure of 1.7 kgf/cm$^2$ or more, and further, foaming tended to be suppressed from a gas pressure of 1.89 kgf/cm$^2$ or more.

The carbonated beverage in the embodiment of the present invention may further comprise components approved as food additives, or components eaten from old times and generally recognized as safe though not approved, such as fruit juices, acidulants, perfumes, extracts of plants, milk products, and other flavors.

<Method for Producing Carbonated Beverage>

According to an embodiment of the present invention, a method for producing a carbonated beverage is provided. The production method comprises preparing a syrup, adjusting the amount of liquid required, and supplying carbon dioxide gas. The syrup herein refers to a solution comprising at least one component described above contained in a carbonated beverage, and comprising substantially no carbon dioxide gas.

The syrup can be prepared by dissolving raw materials such as RebA, RebD, and RebM in water. The RebA content in the syrup can be set so that the content of RebA in the carbonated beverage is 500 ppm or less, preferably 450 ppm or less, more preferably 383 ppm or less, and further preferably 250 ppm or less, and can also be set so that substantially no RebA is contained in the carbonated beverage, but is not limited to these. RebA may be contained in the carbonated beverage to the extent that even slight sweetness is felt, and the content of RebA in the syrup may be set so that, for example, 0.5 ppm or more, preferably 1 ppm or more, and more preferably 16.7 ppm or more of RebA is contained in the carbonated beverage.

The content of RebD and/or RebM in the syrup can be an amount required as an alternative to RebA. RebD or RebM can be contained alone in the syrup, or RebD and RebM can be contained in combination in the syrup. When RebD is contained alone in the syrup, the content of RebD is not limited and can be set so that, for example, the content of RebD in the carbonated beverage is 486 ppm or less. When RebM is contained alone in the syrup, the content of RebM is not limited and can be set so that, for example, the content of RebM in the carbonated beverage is 450 ppm or less, preferably 404 ppm or less, and more preferably 271 ppm or less. When RebD and RebM are contained in combination in the syrup, the total amount of RebD and RebM can be set so that, for example, the content of RebD and RebM in the carbonated beverage is 486 ppm or less. By replacing RebA as a *stevia* extract with ReD and/or RebM in a syrup, sweetness derived from a *stevia* extract can be sufficiently given to a carbonated beverage while the problem of the foaming of the carbonated beverage is addressed. When RebD and RebM are contained in combination in the syrup, RebD and RebM may be combined at any ratio.

RebD and/or RebM and RebA may be contained in the syrup at a particular ratio. For example, ((RebD and/or RebM)/RebA) can be 0.45 or more, preferably 1.1 or more, more preferably 2.5 or more, and further preferably 6.0 or more in a mass ratio. When the ratio is less than 0.45, the influence of RebA is strong, and the foaming of the carbonated beverage sometimes cannot be suppressed.

The total amount of RebA, RebD, and RebM as a *stevia* extract in the syrup can be set in a required range and, for example, can be set in a range that is not problematic in terms of flavor, and can also be set in a range required for a low calorie carbonated beverage. For example, although not limited, the total amount of RebA, RebD, and RebM in the syrup can be set so that the total amount of RebA, RebD, and RebM in the carbonated beverage is equivalent to Brix 0.5 to 13.5, preferably 0.5 to 12, more preferably 0.5 to 11.5, and further preferably 0.5 to 7.5 in terms of sucrose. When the total amount is less than Brix 0.5 in terms of sucrose, not only can sweetness derived from the *stevia* extract not be sufficiently provided, but the bubble suppression effect of the replacement of RebA with RebD and/or RebM may not be sufficiently exerted. On the other hand, in a case where the total amount is more than Brix 13.5 in terms of sucrose, regarding the carbonated beverage, the bubble suppression effect of the replacement of RebA with RebD and/or RebM is not obtained, and moreover the flavor may become worse due to too strong sweetness.

Components generally used in carbonated beverages, such as caffeine, cinnamaldehyde, caramel coloring, and sweeteners (sugar, isomerized liquid sugars, and high intensity sweeteners such as aspartame, sucralose, and acesulfame K), perfumes, acidulants (citric acid, tartaric acid, malic acid, phosphoric acid, and lactic acid), colorants, fruit juices and fruit juice purees, milk and milk products, and nutrient supplements (vitamins, calcium, minerals, and amino acids), may be further contained in the syrup. A single of these components may be contained in the syrup, or a plurality of these components may be contained in combination in the syrup. For example, caffeine, cinnamaldehyde, caramel coloring, or a combination of two or more of these can be contained in the syrup together with the *stevia* extract. As one mode, caffeine can be contained in the syrup in the embodiment of the present invention. Here, the caffeine may be in the form of an extract of a plant comprising caffeine (tea leaves, kola nuts, coffee beans, guarana, or the like) or its concentrate in addition to a purified product that can be used as a food additive (a purified product having a caffeine content of 98.5% or more) and a roughly purified product that can be used as a food (caffeine content 50 to 98.5%). In the embodiment of the present invention, caffeine can be contained in the syrup so that the content in the carbonated beverage is in a particular range. For example, the content of caffeine in the syrup is not limited and can be set so that the caffeine content of the carbonated beverage is 1 to 200 ppm.

As another mode, cinnamaldehyde can be contained in the syrup in the embodiment of the present invention. Cinnamaldehyde can be contained in the syrup so that the content in the carbonated beverage is in a particular range. For example, the content of cinnamaldehyde in the syrup can be set so that cinnamaldehyde in the carbonated beverage is 0.5 to 50 ppm, preferably 0.5 to 32 ppm or 1.0 to 20 ppm.

As still another mode, caramel coloring can be contained in the syrup in the embodiment of the present invention. In the embodiment of the present invention, caramel coloring can be contained in the syrup so that the content in the carbonated beverage is in a particular range.

Sweeteners generally used for the production of beverages, such as sucrose, glucose, fructose, isomerized liquid sugars, and high intensity sweeteners such as aspartame, sucralose, and acesulfame K, may be further contained in the syrup in the embodiment of the present invention. These sweeteners may be contained in the syrup singly or in combination of a plurality of these sweeteners. As one mode, sucrose can be further contained in the syrup in the embodiment of the present invention. Here, the content of sucrose in the syrup can be designed so that sucrose is contained in the carbonated beverage in a particular range. For example, the content of sucrose in the syrup is not limited and can be set so that the content of sucrose in the carbonated beverage is 6 to 12 g/100 g.

In addition, components approved as food additives, or components eaten from old times and generally recognized as safe though not approved, such as fruit juices, acidulants, perfumes, extracts of plants, milk products, and other flavors, may be further contained in the syrup.

In the preparation of a carbonated beverage, the supply of carbon dioxide gas can be performed by mixing a syrup and carbonated water. The mixing may be performed by adding carbonated water to a container comprising the syrup, may be performed by adding the syrup to a container comprising carbonated water, or may be performed while the syrup and carbonated water are transferred to another container. In addition, a syrup and a carbonated beverage may be prepared in the same factory, or a carbonated beverage may be prepared by filling a syrup into a container or the like, transporting it to another factory, and mixing the syrup with carbonated water. Further, it is possible that a syrup is transported to a restaurant or the like, and in the restaurant, a user mixes the syrup and carbonated water to prepare a carbonated beverage. Alternatively, the supply of carbon dioxide gas can also be performed by diluting a syrup with water and then injecting carbon dioxide gas thereto. The amount of carbon dioxide gas supplied to the carbonated beverage can be defined as gas pressure. Carbon dioxide gas can be supplied to the syrup so that the gas pressure in the carbonated beverage is, for example, 1.7 $kgf/cm^2$ or more, 1.89 $kgf/cm^2$ or more, or 2.15 $kgf/cm^2$ or more. An upper limit may be provided to the amount of carbon dioxide gas supplied, as required. Carbon dioxide gas can be supplied to the syrup so that, for example, the gas pressure in the carbonated beverage is 5.0 $kgf/cm^2$ or less or 4.0 $kgf/cm^2$ or less. Therefore, the carbonated beverage can be filled into a container. For the container, a container of any form and material can be used, and, for example, the container may be a container such as a bottle, a can, a barrel, or a PET bottle. In addition, the method for filling the carbonated beverage into a container is also not particularly limited.

What is claimed is:

1. A carbonated beverage comprising RebA, RebD, and RebM in which foaming is suppressed, wherein
    a mass ratio of ((RebD and/or RebM)/RebA) is 0.45 or more,
    RebD and/or RebM are present in an amount of 486 ppm or less; and
    RebA, RebD, and RebM are present in an amount to provide 0.5-13.5° Bx.

2. The carbonated beverage according to claim 1, comprising 500 ppm or less of RebA.

3. The carbonated beverage according to claim 1, comprising caffeine, cinnamaldehyde, or caramel coloring.

4. The carbonated beverage according to claim 1, comprising sucrose.

5. The carbonated beverage according to claim 1, comprising carbon dioxide gas at a gas pressure of 1.89 $kgf/cm^2$ or more.

6. The carbonated beverage according to claim 1, comprising carbon dioxide gas at a gas pressure of 1.89 $kgf/cm^2$ or more.

7. A syrup for preparation of a carbonated beverage comprising RebA, RebD, and RebM, the syrup comprising:
    a mass ratio of ((RebD and/or RebM)/RebA) of 0.45 or more to suppress foaming of the carbonated beverage due to Reb A,
    RebA, RebD, and RebM in an amount to provide 0.5-13.5° Bx to the prepared carbonated beverage; and
    RebD and/or RebM in an amount to provide 486 ppm or less thereof to the prepared carbonated beverage.

8. A method for producing a carbonated beverage, comprising diluting the syrup according to claim 7 with water and then injecting carbon dioxide gas thereto.

9. A method for producing a carbonated beverage comprising RebA in which foaming is suppressed, comprising combining RebA, RebD, and RebM in a mass ratio of ((RebD and/or RebM)/RebA) of 0.45 and in an amount to provide 0.5-13.5° Bx; and carbon dioxide to form a carbonated beverage having suppressed foaming activity.

10. A carbonated beverage which comprises RebA and which does not comprise the following antifoam agents: silicone oils, glycerin fatty acid esters, sorbitan fatty acid esters, sucralose, acesulfame potassium, and non-polymerized catechins, wherein
    the beverage is naturally sweetened with the following sweeteners RebA, RebD, RebM, and sucrose;

a mass ratio of ((RebD and/or RebM)/RebA) in the beverage is 0.45 or more; and foaming is suppressed.

11. The carbonated beverage according to claim 10, comprising 500 ppm or less of RebA and 486 ppm or less of RebD and/or RebM.

12. The carbonated beverage according to claim 10, comprising caffeine.

13. The carbonated beverage according to claim 10 comprising cinnamaldehyde.

14. The carbonated beverage according to claim 10 comprising caramel coloring.

\* \* \* \* \*